United States Patent [19]
Stein

[11] 3,786,287
[45] Jan. 15, 1974

[54] DIRECT CURRENT MOTOR SYSTEM

[76] Inventor: Jesse J. Stein, 115 Trinity Pl., Syracuse, N.Y. 13210

[22] Filed: Dec. 27, 1971

[21] Appl. No.: 212,381

Related U.S. Application Data

[63] Continuation-in-part of Ser. Nos. 866,091, Oct. 6, 1969, Pat. No. 3,631,273, and Ser. No. 678,730, Oct. 27, 1967, abandoned.

[52] U.S. Cl. .................................. 310/46, 310/233
[51] Int. Cl. ......................................... H02k 37/00
[58] Field of Search.................... 310/233, 46, 229, 310/230, 232, 234, 237, 238, 241, 244, 245, 128; 200/11 R, 11 G; 318/138

[56] References Cited
UNITED STATES PATENTS

| | | | |
|---|---|---|---|
| 307,387 | 10/1884 | Griscom | 310/46 |
| 621,827 | 3/1899 | Knight | 310/241 UX |
| 1,127,158 | 2/1915 | Apple | 310/241 |
| 2,668,269 | 2/1954 | Vintenon | 310/230 |

FOREIGN PATENTS OR APPLICATIONS

| | | | |
|---|---|---|---|
| 435,295 | 5/1948 | Italy | 310/128 |
| 1,272,805 | 8/1961 | France | 318/138 |

Primary Examiner—R. Skudy
Attorney—F. P. Keiper et al.

[57] ABSTRACT

A direct current rotary apparatus of the type disclosed in U.S. Pat. No. 3,631,273, of which the present disclosure is a continuation-in-part, the improvement comprising a commutator switch having two arcuate blades, mounted for rotation with the rotor and evenly spaced thereon, and stationary segments connected to the stator coils. The segments are of like angular width and arranged in a circle for contact by the rotating blades which have an angular width approaching, but not greater than, 180° less the angular width of one of the segments. Thus, the stator coils are excited at all times except the relatively short time each blade contacts only one segment, when switching occurs.

3 Claims, 4 Drawing Figures

PATENTED JAN 15 1974 3,786,287

DIRECT CURRENT MOTOR SYSTEM

This is a continuation-in-part of application Ser. No. 866,091, filed Oct. 6, 1969, now U.S. Pat. No. 3,631,273, and application Ser. No. 678,730, filed Oct. 27, 1967, now abandoned.

This invention relates to electro-motors and more particularly to direct current apparatus in which the power connections to the rotor require no commutation.

In direct current motors, it has been the common practice to provide a multipole armature rotating in a stationary field and to employ a commutator and brushes for conducting heavy currents to and from the armature. The present invention is directed to direct current apparatus wherein the rotor is connected to a source of direct current through slip rings, and in which the current necessary to energize the field or stator is commutated or switched whereby the field in effect rotates. Such commutation or switching may be rotated with the rotor. In the present modification a plurality of like segments are employed which are relatively stationary, and rotary switching blades of a restricted angular width wipe the segments and are connected to the slip rings.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
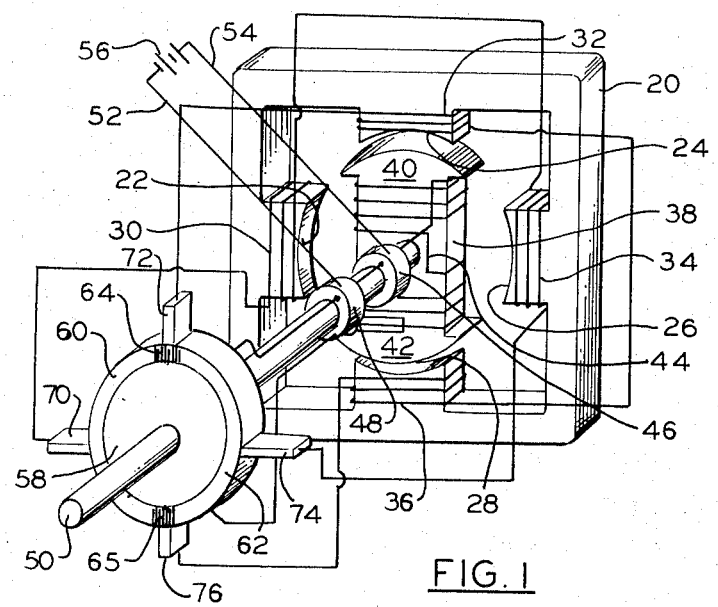
FIG. 1 is a perspective schematic illustration of the motor, slip rings and switching commutator.

Referring to FIG. 1 there is shown a stator 20 which may be made of soft iron laminations or other suitable magnetic circuit material. The stator has pole pieces 22, 24, 26 and 28 uniformly spaced angularly, and each having a winding as indicated at 30, 32, 34 and 36. Rotatably mounted for rotation within the stator is a two pole armature or rotor 38 having poles 40 and 42. A continuous winding 44 establishes one of the rotor poles as a north pole, which for further discussion may be pole 40, pole 42 thus being a south pole. Slip rings 46 and 48 are mounted on and insulated from the shaft 50, to which the rotor is fixed. Any suitable bearings for the shaft 50 are provided as will be understood in the art. Slip ring contacts 52 and 54 are connected to a source of direct current indicated at 56.

Also affixed to the shaft 50 is a switching device 58 of the commutator type, the same comprising two like arcuate segments 60 and 62 of about 175° each, separated by insulation from each other, and intervening segments, 64 and 66, which latter segments are preferably of a width at least equal to the width of the relatively stationary contacting brushes 68, 70, 72 and 74. The brushes 68, 70, 72 and 74 are mounted in a brush holder normally stationary in respect to the rotor as will be understood in the art. The brush holder may comprise a frame which may be rotated through a limited angle to vary the angular relation between the brushes and the field windings to which they are connected, the variation being limited to not greater than 45° in either direction, to provide an overall range of adjustment of not over 90°, for one direction of rotation. While the brush holder may be mounted for angular adjustment as described, it may also be fixed, and any adjustment necessary within the aforesaid angle can be effected by angularly setting the commutator switch 58 with respect to the rotor, to provide the same effect.

The segment 60 is connected to the slip ring 48, and the segment 62 is connected through the rotor winding 44 to the slip ring 46. The brushes 70 and 74 are connected in a first series connection to field coils 30 and 34 and the brushes 72 and 76 are connected in a second series connection to the field coils 32 and 36. The field coils of each pair could as well be connected in parallel depending on the current, voltage and the number of ampere turns desired.

It will be appreciated that with the commutator switch disposed in relation to the rotor as indicated in FIG. 1, clockwise rotation will be effected but the torque produced may be somewhat reduced. Varying speeds and torques may be effected by varying the relative angle between the commutator switch relative to the rotor through a range of 45° to either side of the position shown in FIG. 1, either clockwise or counter-clockwise, depending on the torque desired.

The apparatus may be simplified by the use of a two pole permanent magnet for the rotor, and if desired the apparatus may act as a generator since the rotating rotor field will cut the conductors of the pole piece coils 30, 32, 34 and 36.

If reverse rotation is desired the connection between a pair of opposed brushes to the corresponding field coils can be effected by a simple double pole double throw reversing switch, as will readily be understood, or the commutator switch 58 could be rotated 180° from the position shown in FIG. 1, and thereafter adjusted up to 45° counterclockwise or clockwise with respect to the rotor depending on the torque and speed desired. The limitation as to the adjustment to a range of relative positions within 45° to either side of the position shown in FIG. 1 is required since any adjustment beyond such range will produce stall positions, and render the apparatus non self starting.

Figure 2:
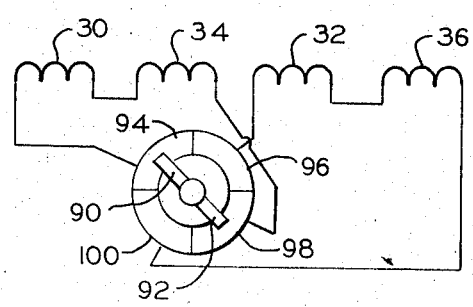
FIG. 2 is a schematic view of the commutator using stationary segments.

Referring to FIG. 2, the collector rings of the rotor are connected to rotating arms 90 and 92, which contact relatively stationary segments 94, 96, 98, 100. Segments 94 and 98 are connected to opposite stator coils 30 and 34, while segments 96 and 100 are connected to opposite stator coils 32 and 36. In this arrangement, only a single pair of stator poles are directly excited at any one time, the arms successively exciting coils 30 and 34 in one direction, and thereafter exciting coils 32 and 36 in one direction, and thereafter exciting coils 30 and 34 in the reverse direction, following excitation of coils 32 and 36 in the reverse direction. Thus one pair of coils are excited while the other pair are simultaneously disconnected. As shown for example segments 96 and 100 are momentarily disconnected and segments 94 and 98 are energized. Thus two poles are temporarily disconnected before reconnecting in reverse.

Figure 3:
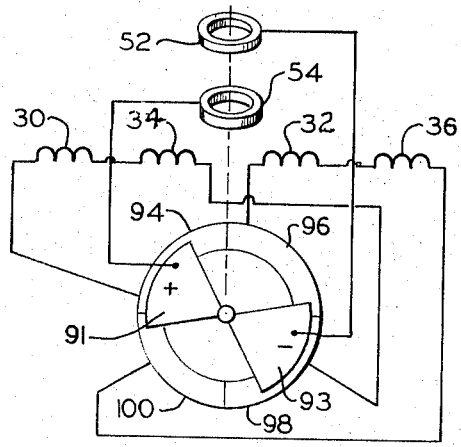
FIG. 3 is a schematic view of a commutator using four like stationary segments and rotary wiper contactors of an angular width not greater than the angular width of a stationary segment.

In FIG. 3 the switching arms 90 and 92 of FIG. 2 are replaced by arcuate blades 91 and 93 insulated from each other, and connected to slip rings 52 and 54 and of an arcuate width close to, but not exceeding the width of any one of the segments 94, 96 and 98, and 100 which are all of like angular width. This limits the time during which, for example, the coils 32 and 36 are deenergized between the current reversals applied to such coils from the slip rings to the blades 91 and 93. In other words the coils 32 and 36 are disconnected from the direct current source, but for a relatively shorter period than occurs in FIG. 2.

Figure 4:
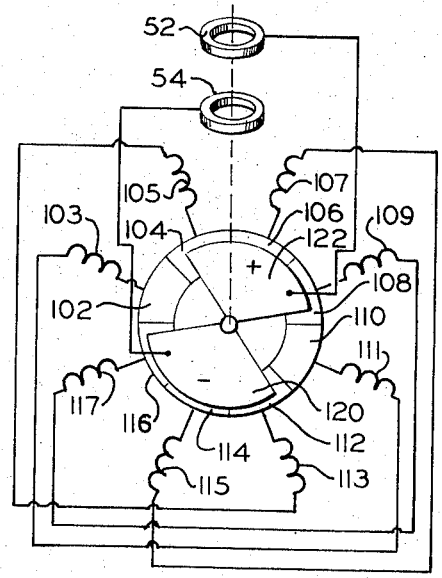
FIG. 4 is a schematic view of a commutator using eight like stationary segments and rotary wiper contactors of an angular width not greater than the angular width of any three adjacent stationary segments.

In FIG. 4 eight like stationary segments are employed, 102, 104, 106, 108, 110, 112, 114 and 116, and are connected to coils 103, 105, 107, 109, 111, 113, 115 and 117 as shown on eight stator poles, coils 103 and 111, being disposed on opposite poles, as are successive coils 105 and 113, and 107 and 115 and 109 and 117. In this form the rotary switching blades 120 and 122, connected to the slip rings are of an arcuate width close to but not exceeding the width of any three adjacent segments, so that opposite segments are open circuited between current reversals, the time of the open circuit being determined by the extent to which the angular width of the blades 120 and 122 are less than the angular width of three successive segments.

The width of the blades that contact the segments in both switches FIG. 3 and FIG. 4 are different. The space between the positive blade and the negative blade is likewise different in both switches; FIG. 3 and FIG. 4. The important point is that the space between the blades must be slightly greater than the length of any one segment to prevent shorting of the power supply. This space varies with the number of like segments used in an equal circumference. The coils are always activated except for the rapid switching of one set of coils at a time. Fundamentally, the motor operation is identical with either type of stator pole, salient or non-salient; or either type of switch, rotating blades or rotating segments.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A direct current rotary apparatus, comprising a stator having at least two pairs of like poles, each pole having a winding, a rotor having a shaft and two opposed magnetic poles, one always north and the other always south, rotatable within said stator, a commutator switch for the windings of said stator, said switch having two arcuate blades mounted on and extending radially from said shaft, two slip rings carried by said rotor and being connected to one and the other of said blades respectively, a plurality of relatively stationary segments angularly spaced uniformly about said shaft and contacted by said blades, a series connection between each opposite pair of segments and two corresponding opposed windings on opposite stator poles, said blades being equally spaced about said shaft and having an angular width approaching but not greater than 180° less the angular width of one segment.

2. Apparatus according to claim 1 wherein the number of pairs of poles are two and the number of segments are four, and the angular width of each blade approaches 90° but is not greater than 90°.

3. Apparatus according to claim 1 wherein the number of pairs of poles are four and the number of segments are eight, and the angular width of each blade approaches 135° but is not greater than 135°.

* * * * *